United States Patent [19]

Haladay

[11] 3,756,089

[45] Sept. 4, 1973

[54] LINKAGE FOR NARROW ENVIRONMENTS

[76] Inventor: Henry F. Haladay, 31 Village Way, Smithtown, N.Y. 11787

[22] Filed: Apr. 15, 1971

[21] Appl. No.: 134,199

[52] U.S. Cl. .................................... 74/96, 16/163
[51] Int. Cl. .......................................... F16h 21/04
[58] Field of Search ......................... 74/96; 308/72; 16/128, 163

[56] References Cited
UNITED STATES PATENTS

| | | | |
|---|---|---|---|
| 2,932,473 | 4/1960 | Kass et al. | 16/128 |
| 2,669,401 | 2/1954 | Bosserman | 74/96 |
| 2,304,595 | 12/1942 | Prentice | 308/72 |
| 141,037 | 7/1873 | Cross | 74/96 |
| 3,022,928 | 2/1962 | Ulmitz | 74/96 |

Primary Examiner—Charles J. Myhre
Assistant Examiner—Wesley S. Ratliff, Jr.
Attorney—Brumbaugh, Graves, Donohue & Raymond

[57] ABSTRACT

A low profile linkage movable in narrow environments to drive pivotable members. A plate has lugs spaced along one edge, pivotally connected to mating lugs along an edge of the driven pivotable member. A link connects a drive lever to the plate to drive the plate and pivot the pivotable member. The link includes two spaced tabs extending from an integral bolt. The integral bolt and a pair of flanged sleeve bearings extend through a hole in the plate. The tabs receive between them a self-aligning bearing and an end of the drive lever. The plate and link are permitted slight misalignment with the lever which is centrally pivoted for planar pivotal movement. An additional bearing, which may be self-aligning, may connect a drive member to the lever's remaining end.

21 Claims, 5 Drawing Figures

Patented Sept. 4, 1973  3,756,089

INVENTOR.
HENRY F. HALADAY

BY
Brumbaugh, Graves, Donohue, & Raymond his ATTORNEYS.

Patented Sept. 4, 1973

INVENTOR.
HENRY F. HALADAY

BY
his ATTORNEYS.

LINKAGE FOR NARROW ENVIRONMENTS

BACKGROUND OF THE INVENTION

This invention relates to a drive for a pivotal member, and more particularly, to a low profile linkage suitable to drive a pivotable member where space for the linkage is restricted in one direction.

Perhaps the most simple and efficient aileron or other aircraft control flap assembly is a hinged air surface defining member driven by a crank and push rod linkage. This type of arrangement has been used in the past, but has often required an exterior protrusion to accommodate the linkage which would not fit within the available space in a given airfoil. A protrusion such as this, or an airfoil of increased thickness, increases drag on the aircraft. Of course, in producing higher performance aircraft with greatly increased speed capabilities, drag becomes more and more critical. In an aircraft, particularly a high speed, high performance aircraft, drag adversely affects range, maneuvering ability, and rate of climb, as well as speed. Overcoming the added drag which is caused by the increased frontal area required for conventional linkage, while meeting specified performance characteristics, requires increased engine power and fuel capacity, both of which add weight. The same considerations apply, although they are less critical, in planning even the simplest of aircraft.

Invented particularly to fit within the narrow confines of a wing or tail section to operate control surfaces or flaps, such as slats, ailerons, rudders, or elevators, the novel linkage described herein finds other applications where space in one direction is limited. In aircraft alone, applications of a low contour linkage are manifold. Some exemplary applications are engine door actuation, speed brake door actuation, wing tip speed brake operation, and engine exhaust nozzle control. In aircraft engineering, minimal space between inner compartments and outer walls often is an objective because this too reduces frontal area and, as a result, drag.

SUMMARY OF THE INVENTION

An important object of this invention is to provide a linkage useable in a narrow space to drive a pivotable member.

Another object of the invention is to provide a pivotable member drive, or drive linkage assembly, which affords a sturdy interconnection between the pivotable member and the driving linkage, yet is relatively narrow.

An additional object of the invention is to provide a pivotable member drive linkage with a low contour, a relatively strong construction, and a durable interconnection with the pivotable member, yet especially narrow where the linkage joins the pivotable member so that, there, the connection to the pivotable member may be offset from the pivotal axis of the member in the limited available space to provide a moment arm.

Yet another object of this invention is to provide a link and lever drive arrangement particularly suitable for use in narrow environments.

According to this invention, the above and other objects are achieved by a linkage which includes a plate or plate-like member pivotally connected to a pivotable member to be driven. A plurality of spaced interconnecting parts forms a relatively long, narrow interconnection between the plate and the driven member, slightly offset from an axis about which the driven member is pivotable, and pivots the driven member when the plate is shifted. A first and a second series of spaced lugs on the plate and on the driven member, respectively, mate and are interlocked by a pin extending through linearly aligned bores in the lugs. This provides an efficient interconnection of parts which may have the strength of conventional interconnections while being of substantially reduced thickness. The narrow joinder of parts may be offset sufficiently from the driven member's pivotal axis to establish the moment arm required, even within very narrow locations.

Mounted for planar pivotal movement, that is, pivotal movement about a single pivotal aixs, within the narrow space available, a lever drives the plate via a link pivotally connected at one end to the lever and at the other to the plate. The link permits slight misalignment, or movement from an essentially coplanar relationship, between the lever and the plate. This misalignment occurs because the plate movement is not entirely planar, but arcuate where the plate edge and the driven pivotable member connect, requiring at least some slight tilting of the plate relative to the lever and its supporting structure. The lever may be a bell crank lever if a driving force applied to the lever must be changed in direction for application to the plate.

The link between the plate and the lever transmits the driving force to the plate. The link includes an integral bolt and two spaced tabs projecting from the bolt to form a yoke. The bolt and a pair of flanged sleeve bearings extend through a hole in the plate. The plate and the link thus remain aligned, in essentially coplanar relationship, being connected for only planar pivotal movement therebetween about the axis defined by the sleeve bearing and the bolt. The slight, nonplanar misalignment between the plate and the lever is permitted by a self-aligning bearing held between the spaced tabs and interconnecting the link and the lever. The self-aligning bearing permits universal movement between the lever and the link, and thus also between the lever and plate.

The link between the plate and the lever also permits arcuate movement of the driving lever end relative to the plate. Since the plate moves normal to the pivotal axis of the flap and is constrained, by its pivotal connection with the flap, against pivotal movement in the plane in which the lever moves or in any parallel plane the plate cannot accommodate arcuate movement of the lever. Pivotally connected at each of its ends, the link permits arcuate lever movement relative to the plate as needed to avoid a locked structure.

IN THE DRAWINGS

DESCRIPTION OF PREFERRED EMBODIMENT

Figure 1:
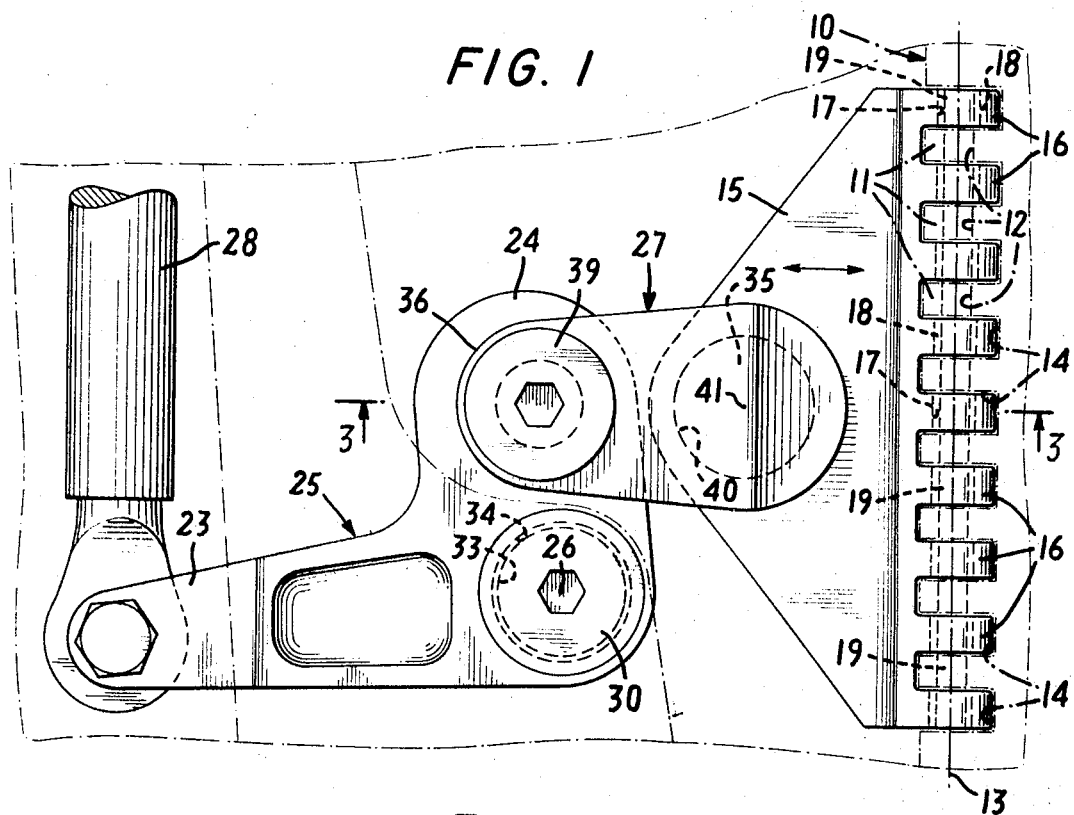
FIG. 1 is a fragmentary top plan view of an assembly according to the invention and shows the mating lugs of a drive plate and pivotable flap, with the latter and other assembly shown in phantom outline.

Referring now to the drawings in detail, FIG. 1 shows a flap 10 forming part of the air surface of an aircraft wing or tail section. The flap 10 might be an aileron, rudder, elevator or any control surface pivotable to control an aircraft flight path. Along its edge, the flap 10 supports a series of lugs 11. An aligned plurality of bores 12 extends through the lugs 11 linearly along an axis 13. Adjacent lugs 11 define a series of spaces 14.

Figure 2:
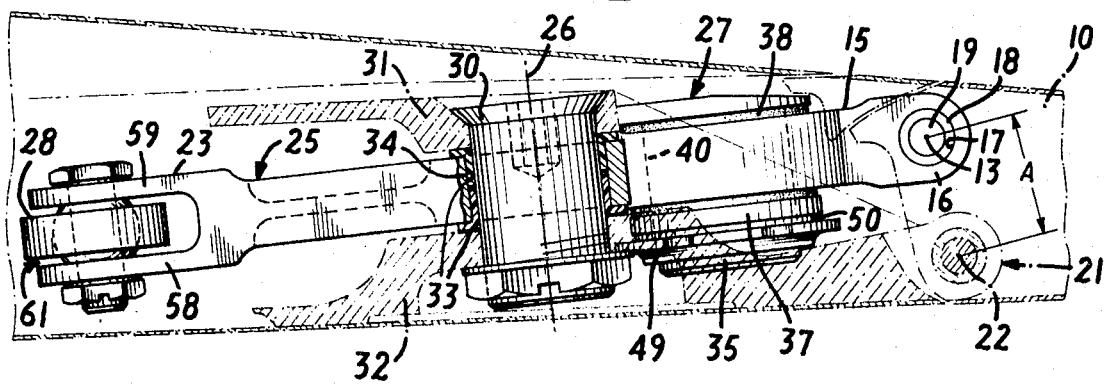
FIG. 2 is a fragmentary side elevational view of the assembly of FIG. 1, partly in section and with parts broken away for clarity, and illustrates the plate and flap interconnection in relation to the flap's pivotal axis.

Along an edge of a drive plate 15, a second series of lugs 16 extends into the spacers 14, mating with the lugs 11. The lugs 16 define a cooperating set of aligned bores 17 which lay in alignment with the bores 12 along the axis 13, but are of greater diameter and house sleeve bearings 18. A pin 19 through the bores 12 and 17 pivotally interconnects the two sets of lugs 11 and 16, completing a pivotal connection between the flap 10 and its drive plate 15. As best shown in FIG. 2, the sleeve bearings 18 pivotally support the plate 15 on the pin 19.

A suitable pivotal connection arrangement 21 connects the flap 10 with aircraft structure for pivotal movement of the flap about an axis 22, parallel to the axis 13. The aircraft wing or tail section shown in FIG. 2 provides little available space near the pivotal axis of the flap to house the drive. The use of repeated, aligned lugs permits a strong, hinged driving connection formed entirely of members of reduced width.

Although only a narrow space is available to house the drive assembly, even less space is available for the pivotal drive connection to the flap. Because the flap 10 must be pivoted about the axis 22, a suitable moment arm is required. Therefore the interconnection of the flap with the driving member must at least be slightly offset from the axis 22 and yet be housed in the available space. In FIG. 2, the dimension A is the moment arm made available by the narrow mating lug connection.

To control the flap 10, the plate 15 is driven forward and backward in the directions of the unnumbered arrow shown thereon in FIG. 1 and normal to the pivotal axis 22 of the flap. The plate shifts, then, perpendicular to its shortest dimension, its thickness, and perpendicular to the direction in which available space is most restricted. A bell crank lever 25 is pivotable about an axis 26, and a link 27 connects one end 24 of the bell crank lever with the plate. The lever's remaining end 23 is driven by, for example, a push rod 28. The bell crank lever 25 is pivotally supported by a bolt 30 extending in the direction of limited available space and carried between spaced lugs 31 and 32, or like structure. A pair of flanged sleeve bearings 33 extends through an aperture 34 in the lever, each of the two bearings extending inwardly from an end of the aperture. The bearing so formed surrounds the bolt 30, and permits planar pivotal movement of the lever about its axis 26. The movement of the bell crank lever 25, when driven by the rod 28, redirects the rod's driving force by approximately 90°, for application to the plate 15.

Figure 3:
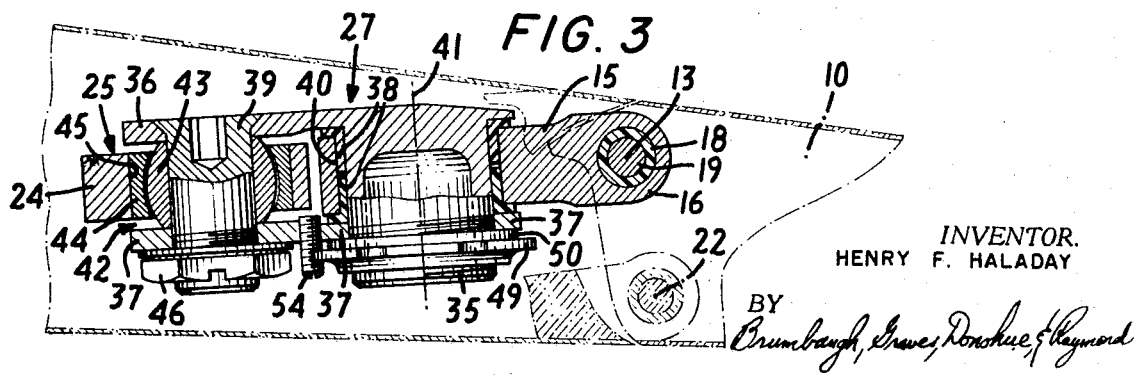
FIG. 3 is a sectional view taken along the line 3—3 of FIG. 1 and shows the link and bearing arrangement which interconnects the multiple lug plate and the driving bell crank lever.

The link 27 is especially provided for the low profile drive assembly. As shown in FIG. 3, the link includes an integral bolt 35 at one end, and a yoke at the other formed by a pair of spaced tabs 36 and 37. The integral bolt seats a pair of flanged sleeve bearings 38, and extends through a hole 40 in the plate 15. The flanged sleeve bearings 38, like the flanged sleeve bearings 33, may be formed of suitable bearing material. For example, they may be of the teflon fabric lined type. The integral bolt 35 and the bearings 38 pivotally couple the plate and the link to allow for slight planar pivotal movement therebetween about an axis 41.

The tab 37 is removable from the integral bolt 35 to permit insertion of the integral bolt 35 and the sleeve bearings 38 through the hole 40. A spherical self-aligning bearing 42 between the tabs 36 and 37 connects the link with the lever end 24 which is received between the tabs. The self-aligning bearing 42 does not restrict the lever and the link to pivotal movement in only a single plane about a single pivotal axis. Rather the bearing 42 permits universal movement and non-planar misalignment between the link and the lever. A bolt 39 spans the tabs 36 and 37 and supports a part of the bearing 42, a bearing member 43 with a spherical outside diameter. In mating relation, a bearing member 44 with a spherical inside diameter is held in a bore 45 in the lever end 24. A nut 46 retains the entire bearing arrangement.

Although the plate 15 and the link 27 are restrained against movement other than about the single axis 41, the misalignment of the link and plate relative to the bell crank lever 25, which is permitted by the bearing 42, allows a slight tilting of the plate 15 relative to the lever 25. Hence the plate's shifting movement, while it is substantially linear, does include this slight rocking or tilting. Movement of the interconnected lugs arcuately about the pivotal axis 22 of the flap 10, rather than linearly, requires this slight tilting.

Because of the multiple lug connection which constrains the plate against arcuate movement other than pivotal movement relative to the flap 10 about the axis 13 and normal to the axis 22, the plate is unable to pivot in a plane parallel to the motion of the lever 25 and is therefore unable to accommodate the arcuate motion of the lever end 24 as the lever pivots about the axis 26. It becomes necessary, therefore, to accommodate such arcuate movement, without which accommodation the mechanism would be immovable. To that end, the link 27 and the bearing connections at its ends permit the relative movement necessary.

Figures 4, 5:
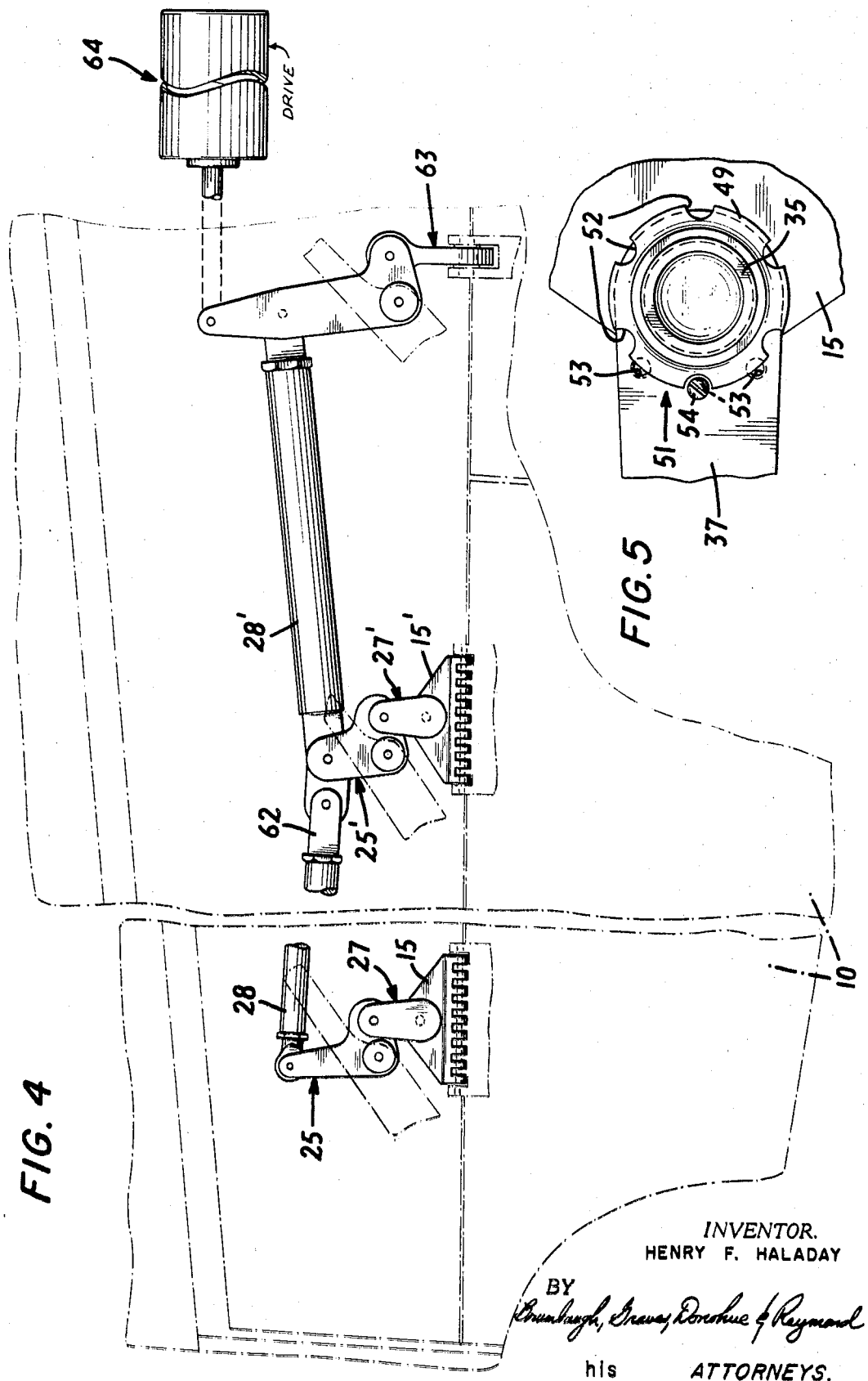
FIG. 4 is a fragmentary top plan view, partly diagrammatic, which shows multiple linkages according to the invention commonly driven and cooperating with other, less narrow linkages to operate flaps.
FIG. 5 is a fragmentary bottom plan view of a locking arrangement for the integral bolt, sleeve bearing and separable tab on the link shown in FIG. 3.

A nut 49 retains the removable tab 37 on the integral bolt 35. Because the tab 37 is not rigidly or integrally connected with the integral bolt 35, the nut 49 should be tightened down sufficiently on the integral bolt firmly to support the tab at the interface of the tab 37 and a washer 50, and to resist bending moments applied to the tab. On the other hand, the nut 49 must not be tightened down so extremely as to bind the pivotal connection. To meet these conditions, which require relatively exact positioning of the nut on the integral bolt, the threads on the nut and the bolt are fine, and the nut is provided with a vernier means of secondary locking 51, best shown in FIG. 5, precisely to position the nut on the bolt and lock it there. FIG. 5 shows six notches 52 spaced about the periphery of the nut 49. Three tapped holes 53 are located on the tab 37 for cooperation with the notches. The holes 53 are less distantly spaced than the notches 52 to provide greater adjustability of the nut 49 on the bolt 35. Once the nut 49 has been tightened as desired, with a notch 52 aligned with a hole 53, a set screw 54 threaded into the aligned hole locks the nut 49.

At the remote end 23 of the bell crank lever 25 a yoke is formed. Between its arms 58 and 59 the yoke receives a further self-aligning bearing 61 similar to the bearing 42, just described. This bearing pivotally connects the driving push rod 28 and the bell crank lever 25, and permits slight misalignment between the two. Particularly in aircraft wing and tail sections, where stresses are permitted to cause slight movements of those sections, the self-aligning bearing 61 permits such movement without adverse effect, binding or the like, in the interconnected moving parts. Of course, where no misalignment of the lever and connected drive is encountered, a simpler, more economic bearing arrangement may be substituted for the self-aligning bearing 61, providing only pivotal movement about a single axis.

Turning to FIG. 4, the use of multiple linkages in aircraft flap control is illustrated. Depending upon the length of the wing or tail section shown, a number of plates 15, 15', etc., may be connected along the length of the control flap 10 and driven by cooperating links 27, 27', and levers 25, 25', as required. The last drive rod 28 connected with the lever 25 corresponds to the rod 28 shown in FIG. 1. However, the rod 28' connected with the further lever 25', is adapted pivotally to connect with an end 62 of a drive rod next in line, as well as with the bell crank lever 25'.

Nearer the body of the craft, a more conventional linkage may be employed as identified generally at 63, since usually greater wing or tail section thickness is available there. The drive means 64 is suitably selected and is, of course, remotely controlled.

From the foregoing it will be understood that the novel arrangements described are not limited solely to use in aircraft applications although they are particularly well suited to such use. While specific preferred embodiments have been described in detail above, modifications may be made as will be apparent to those skilled in the art without departure from the spirit and the scope of this invention as defined in the appended claims.

I claim:

1. In drive linkage for moving a pivotable member, the linkage to be located where available space in one direction is restricted near the pivotal support axis of the member; the combination comprising a relatively thin plate, spaced plural means supported on the plate for pivotally connecting the plate to the pivotable member along a common pivotal drive axis shared by the plate and the pivotal member, and means connected to the plate for substantially linear shifting of the plate perpendicular to the direction of said pivotal support axis, to thereby pivot the pivotable member.

2. The combination according to claim 1 wherein said spaced plural means are substantially thinner than the dimension in which available space is restricted, and the means for moving the plate comprises means for forcing the plate back and forth within the limited available space.

3. The combination according to claim 1 in which the connecting means comprises a series of spaced lugs linearly arranged on the plate, and the lugs define therebetween spaces adapted to receive mating lugs on the pivotal member.

4. The combination according to claim 3 in which the lugs are bored along an axis parallel to the direction in which the mating lugs are linearly arranged to provide means for receiving a pin to pivotally connect the lugs on the plate with the lugs on the pivotable member.

5. The combination according to claim 1 wherein the plate moving means includes a lever and a link connected between the lever and the plate, said lever being responsive to driving forces applied thereto to shift the plate and thereby pivot the pivotable member.

6. The combination according to claim 5 further including a first bearing means interconnecting the link and the lever, and a second bearing means interconnecting the link and the plate, the link and the first and second bearing means providing means facilitating arcuate movement of the lever relative to the plate.

7. The combination according to claim 5 further including means for permitting tilting misalignment of the plate relative to the lever sufficiently to permit said plate edge to move arcuately relative to the pivotal support axis of the pivotable member.

8. The combination according to claim 7 wherein the misalignment permitting means comprises a self-aligning bearing connecting the link with one of the lever and plate.

9. The combination according to claim 7 in which a self-aligning bearing interconnects the link and the lever, and said link defines a yoke at one end receiving the bearing and an arm of the lever.

10. The combination according to claim 7 in which the lever is a bell crank lever, adapted centrally to pivot, and thereby to translate driving movement applied thereto in a first direction to movement applied in a second direction to the plate.

11. The combination according to claim 10 wherein the bell crank lever terminates in yoke means at its end remote from the link, is adapted to receive a further drive member, and a self-aligning bearing is received within the yoke means for interconnecting the further drive member and the bell crank lever.

12. The combination according to claim 5 further including two bearings connecting the link is driving relation between the lever and the plate, one of said bearings constraining movement other than about a single pivotal axis, the other bearing allowing universal pivotal movement about more than a single pivotal axis to thereby permit at least slight misalignment of the plate and the lever.

13. The combination according to claim 12 wherein the link comprises an integral bolt and a pair of spaced tabs extending from the bolt, the bearing constraining movement is supported on the bolt to permit pivotal movement about the bolt, and the bearing permitting universal movement is a spherical bearing held between said tabs.

14. The combination according to claim 13 wherein at least one of the tabs is separable from the integral bolt, and the bolt is threaded and adapted to hold at least one separable tab captive thereon by receipt of an internally threaded member.

15. The combination according to claim 14 wherein the bearing on the bolt is at least one sleeve bearing with radially outwardly projecting flanges for projection beyond the edge of an associated hold through which the bolt and sleeve bearing extend, the bolt is finely threaded, and the link and the threaded member further include means for locking the internally threaded member against movement when the threaded member is tightened on the bolt sufficiently to adequately support said at least one separable tab without binding the parts pivotally interconnected by said sleeve bearing.

16. Drive means for pivoting a member about a support axis and containable within a narrowly confined space adjacent said support axis; the combination including a first plurality of spaced lugs on the member shortly offset from said support axis, a plate with a second plurality of lugs disposed in spaces between the first plurality of lugs, means pivotally interconnecting the first and second lugs along a drive axis spaced from the support axis, pivotable support means in addition to said pluralities of lugs located along said support axis and pivotally supporting the member, and means for driving the plate to move the interconnected first and second lugs relatively to said support axis thereby to pivot the pivotable member.

17. The combination according to claim 16 wherein said first and second plurality of lugs are narrow in comparison with the available space and are bored along a line parallel to said support axis and are pinned together by a pin through the first and second plurality of lugs, one of the first and second plurality of lugs being pivotable relative to said pin, the pivotable support means along the support axis being similarly narrow, and the distance between said pin and said support axis providing a moment arm within the available space.

18. The combination according to claim 16 wherein the driving means includes a lever for moving the plate, and means interconnecting the lever and the plate for permitting pivoting of the plate sufficiently out of planar alignment with the lever as required by movement of the lugs arcuately relative to said support axis.

19. The combination according to claim 16 wherein the driving means includes a lever for moving the plate, and means interconnecting the lever and the plate for permitting arcuate movement of the lever in a direction in which the plate is constrained against arcuate movement.

20. The combination according to claim 16 wherein the plate and the driving means are housed between closely spaced walls constituting airplane structure, the plate and the driving means being movable generally parallel to the walls and within the space between the walls to pivot the member into and out of alignment with the walls.

21. The combination according to claim 20 wherein the walls are exterior walls forming an airfoil, and the pivotable member is a control flap with exterior air surfaces angularly movable relative to the walls to control airplane flight.

* * * * *